United States Patent

Weichmann et al.

Patent Number: 6,024,504
Date of Patent: Feb. 15, 2000

[54] PROCESS FOR CORRECTING GEOMETRIC ERRORS IN THE TRANSFER OF INFORMATION TO A PRINTING STOCK

[75] Inventors: Armin Weichmann, Kissing; Gregor Enke, Augsburg, both of Germany

[73] Assignee: MAN Roland Druckmaschinen AG, Offenbach am Main, Germany

[21] Appl. No.: 09/093,440

[22] Filed: Jun. 8, 1998

[30] Foreign Application Priority Data

Jun. 7, 1997 [DE] Germany ............................ 197 24 066

[51] Int. Cl.$^7$ ........................................................ B41J 5/30
[52] U.S. Cl. ............................ 400/61; 358/456; 358/406
[58] Field of Search ........................... 358/456, 406; 364/518; 400/61

[56] References Cited

U.S. PATENT DOCUMENTS

| | | | |
|---|---|---|---|
| 4,629,342 | 12/1986 | Futaki | 400/121 |
| 4,937,761 | 6/1990 | Hassett | 364/518 |
| 5,174,205 | 12/1992 | Kline et al. | |
| 5,182,990 | 2/1993 | Kline et al. | |
| 5,453,777 | 9/1995 | Pensavecchia et al. | |
| 5,528,194 | 6/1996 | Ohtani et al. | |
| 5,642,202 | 6/1997 | Williams et al. | 358/406 |
| 5,654,808 | 8/1997 | Herregods et al. | 358/456 |

FOREIGN PATENT DOCUMENTS

| | | | |
|---|---|---|---|
| 0 401 858 A2 | 12/1990 | European Pat. Off. | H04N 5/217 |
| 0734152 A2 | 4/1996 | European Pat. Off. | H04N 1/405 |
| 3843232 A1 | 6/1990 | Germany | G06F 15/68 |
| 44 03 861 A1 | 8/1995 | Germany | B41F 33/14 |
| 195 25 528 A1 | 1/1997 | Germany | B05D 1/36 |
| 56-040978 | 4/1981 | Japan . | |
| 60-262240 | 12/1985 | Japan . | |
| 4-119476 | 4/1992 | Japan . | |
| 5-189553 | 7/1993 | Japan . | |

OTHER PUBLICATIONS 8.6 Digitale Druckvorstufe: Druckformherstellung und Druck, Offsedruck technik by Helmut Teschner, dated Apr. 1997; 12 pp.

*Primary Examiner*—Edgar Burr
*Assistant Examiner*—Charles H. Nolan, Jr.
*Attorney, Agent, or Firm*—Cohen, Pontani, Lieberman & Pavane

[57] ABSTRACT

A process corrects geometric errors in the transfer of information without mechanical intervention on the printing form, to compensate for the errors that occur and thus attain optimized print quality prior to imaging. The corrections are visually indiscernible, so that the artifacts created in the printed result by the corrections do not stand out in the image. A device-independent description of the page information to be printed is converted by a Raster Imaging Process into at least one device-dependent digital matrix. Each matrix with m rows and n columns contains the information for a certain color to be printed. After the individual matrices are produced, they are supplied to a matrix manipulation device, which subjects each matrix to a correction transformation using specific parameters. After the matrices are adjusted, they are supplied by a matrix transfer device to the digital imaging devices in the printing mechanisms.

16 Claims, 5 Drawing Sheets

PROCESS FOR CORRECTING GEOMETRIC ERRORS IN THE TRANSFER OF INFORMATION TO A PRINTING STOCK

BACKGROUND OF THE INVENTION

1. Field of the Invention

The invention relates to a process and a device for correcting geometric errors in the transfer of information to a printing stock.

2. Description of the Related Art

The transfer of information to a printing stock is performed by a printing machine that has one or more digital imaging units, which are used for the depiction of the information. For imaging, machine-dependent digital matrix data, such as those produced by a screen image processor, are required. For each color to be used, the screen image processor generates a matrix of digital data intended for the printing mechanisms with the given imaging units. The imaging units can print directly on the paper such, for example, as inkjet printers, via several intermediate steps such, for example, as electrophotography, or by first producing a permanent printing form such as in offset printing.

Processes for digitally imaging a printing form which include compensation for imaging-related errors are known (see U.S. Pat. Nos. 5182990, 5453777, and 5174205). In these processes, geometric errors caused by the printing machine or the printing process with its materials are compensated for by mechanical intervention on the printing form itself. If the possibilities for such intervention are limited, for example, by a rigid printing form such as that used in the erasable computer-to-press process, the possibilities of mechanical intervention are not available.

Geometric errors occur during the imaging of films, during the use of printing plates and printing cylinders, as well as during the use of printing machines, printing processes and with various materials used. These geometric errors reduce the quality of the printed product.

SUMMARY OF THE INVENTION

The object of the invention is to develop a process that, prior to imaging, corrects geometric errors in the transfer of information without mechanical intervention on the printing form to compensate for the errors that occur and thus achieve optimized print quality, wherein the corrections are carried out in the most visually inconspicuous manner possible so that artifacts created in the printed result by the correction are not readily discernable.

This object is attained according to the invention by a process for correcting geometric errors in the transfer of information to a printing stock, comprising the steps of creating at least one device-dependent matrix using a device-independent description of the information to be printed, supplying the at least one device-dependent matrix to a matrix manipulation device, transforming said at least one device-dependent matrix to at least one transformed matrix by subjecting the elements of the at least one matrix to a correction transformation using correction functions depending on previously generated parameter values, wherein the parameter values are generated using measurement technology, and supplying the at least one transformed matrix to at least one digital imaging unit.

The object is also attained according to the invention by a device for correcting geometric errors in the transfer of information to a printing stock, comprising a description unit that offers a device-independent description of the page information to be printed, a raster image (RIP) process unit operatively connected to said description unit for converting the device-independent description into device-dependent digital information in the form of at least one device-dependent matrix, a matrix manipulation device that subjects the at least one device-dependent matrix to a correction transformation, and a matrix transfer device via which the at least one transformed matrix is supplied to digital imaging devices of a printing device.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings wherein like reference characters denote similar elements throughout the several views.

DETAILED DESCRIPTION OF THE PRESENTLY PREFERRED EMBODIMENTS

Figure 1:
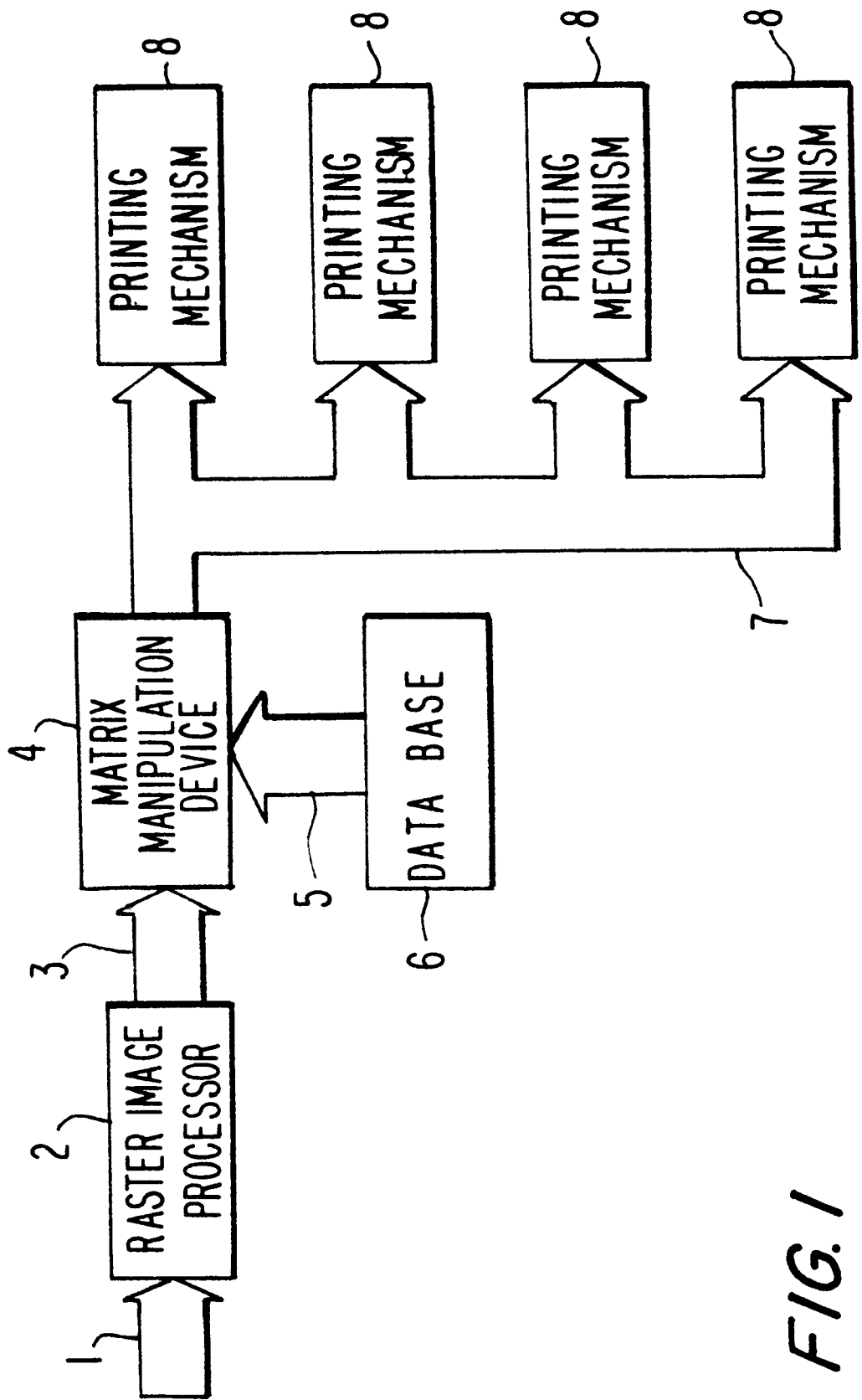
FIG. 1 is a basic flow diagram showing the process for correcting geometric errors.

Referring initially to FIG. 1, the process according to the invention starts from a device-independent description of the page information 1 to be printed. The page information may be provided in a page-description language such, for example, as PostScript. The page information 1 is converted by a raster image processor (RIP) 2 into at least one device-dependent digital matrix 3. Each of the at least one device-dependent digital matrix 3 has m rows and n columns containing information for a certain color to be printed. The elements of the matrix may be considered as grid points of a grid, whereby the associated location of one element leads in trivial fashion to (i, j), where i is the running index of the rows and j is the running index of the columns.

Given suitable selection of the matrix origin in relation to the printing stock, whereby $I_x$ is the spacing of the grid points in the row direction and $I_y$ is the spacing of the grid points in the column direction, the associated location in the real image is then:

$$\begin{pmatrix} x \\ y \end{pmatrix} = \begin{pmatrix} I_x \\ I_y \end{pmatrix} \cdot \begin{pmatrix} i \\ j \end{pmatrix}$$

After the at least one device-dependent digital matrix 3 is produced, it is supplied to a matrix manipulation device 4, which subjects each matrix 3, using particular parameters 5, to a correction transformation. The parameters 5 are maintained in a data base 6, where suitable parameter sets for particular machine, paper and ink combinations are stored. The parameter sets may be created, for example, by suitable test printing when the machine is placed into operation or, dynamically, by suitable measurement devices during a printing run. The first matrix to be printed, for example, may thereby be used to serve as a reference for the other matrices.

After correction transformation of the matrices 3, they are supplied by a matrix transfer device 7 to the digital imaging devices in the printing mechanisms 8.

Figure 2A:
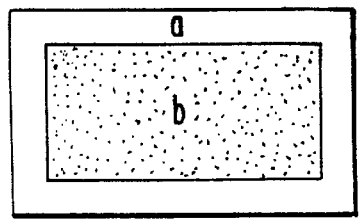
FIG. 2 shows the different possible geometric errors and their correction.

Referring now also to FIGS. 2A through 2I, the possible types of geometric errors are shown. FIG. 2A shows maximum possible image matrix (a) in image (A). The actual information matrix that contains the information to be transferred is represented by area (b). The information to be transferred is always smaller than the maximum possible imaging format. The matrix may comprise binary elements as well as of elements that describe more than two states.

Figure 2B:
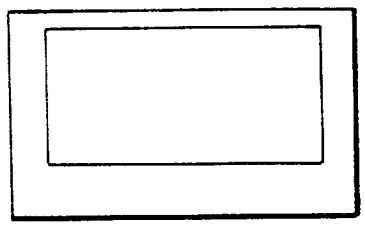
Figure 2C:
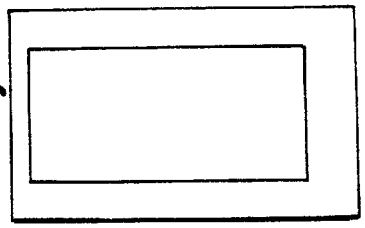
Figure 2D:
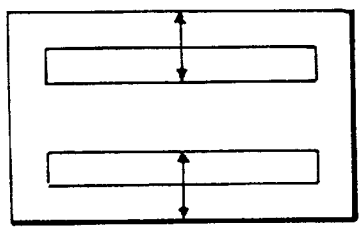
Figure 2E:
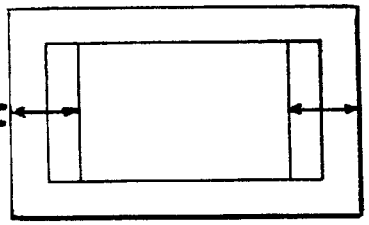
Figure 2F:
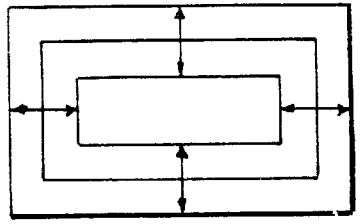
Figure 2G:
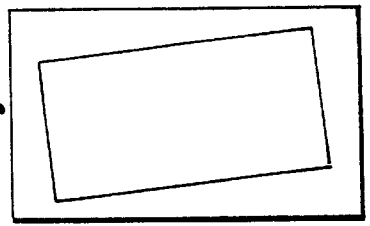
Figure 2H:
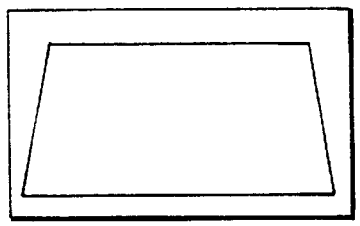
Figure 2I:
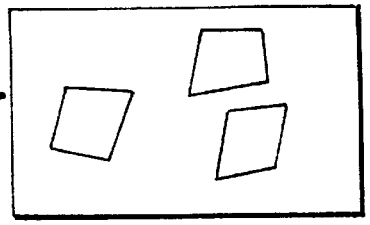

The following errors in FIGS. 2B through 2I may occur during the transfer of information to a printing stock: A circumferential register error is shown in FIG. 2B, a lateral register error is shown in FIG. 2C, a print length does not fit error is shown in FIG. 2D, a print width of individual color separations does not fit error is shown in FIG. 2E, a print length and print width do not fit error is shown in FIG. 2F, a twisted subject is shown in FIG. 2G, a fan-out effect error (trapezoidal geometric error) is shown in FIG. 2H, and local register errors are shown in FIG. 2I.

The matrix manipulation device 4 (FIG. 1) is provided for correction of the above types of geometric errors. To correct the errors, the matrix manipulation device 4 may work with portions of the matrix such, for example, as a certain number of rows.

Figure 3:
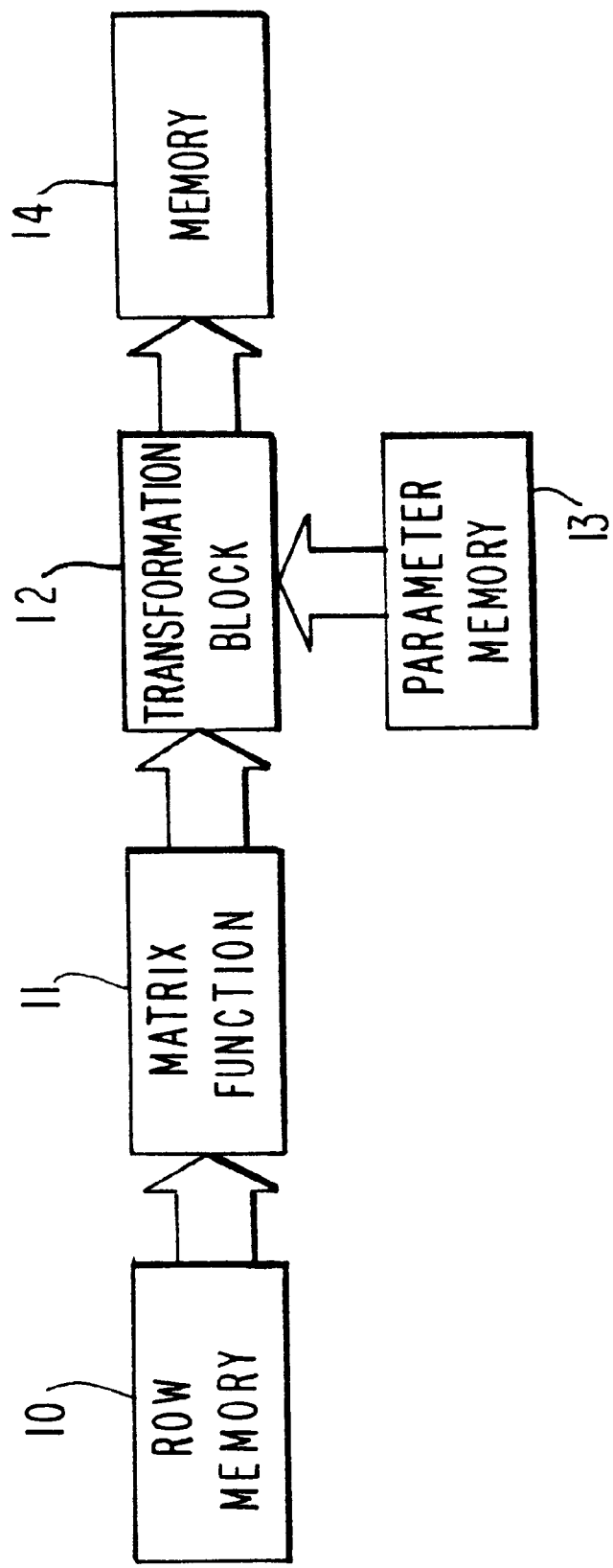
FIG. 3 is a flow diagram for a matrix manipulation device.

Referring now to FIG. 3, an example of the working method of the matrix manipulation device 4 is shown in greater detail. The matrix manipulation device 4 comprises a row memory 10, which stores portions of a total matrix or the total matrix, a matrix function 11, which determines the information matrix from the total matrix, and the actual transformation block 12, which retrieves, from a parameter memory 13, the appropriate transformation parameters for the matrices to be manipulated. The transformation results are then supplied to a memory 14.

To transfer information to a printing stock, several matrices are normally required, which are also known as color separations. For each matrix, various parameter sets are defined. The subsequent operations basically are always performed on one matrix, independent of the others. The parameter sets which are stored in the database 6 are determined using reference prints of suitable subjects. Specifically, suitable subjects include [non]-use elements and electronically analyzable position markings. However, analysis may also be performed in the course of normal production by measuring suitable elements of the subject, such as edges, points or already existing register elements. It is also possible to insert elements especially for this measurement operation when designing the subject.

On the basis of the measurement results, the parameters of the transformation may then be determined by any generally known process.

The measurements may be performed outside of the printing machine or via measurement devices integrated in the machine during a printing run.

The described error types shown in FIGS. 2B and 2C may be solved by simple displacement operators, the error types in FIGS. 2D, 2E, and 2F may be eliminated by scaling operators, the error in FIG. 2G may be eliminated by a rotation operator, and the errors in FIGS. 2H and 2I are correctable using functions that describe the locally varying scalings.

In practice, a superimposition of all of these error types usually occurs. The correction function is then determined as follows: The errors may be detected individually and the resulting functions linked to form one resulting function that describes the sequential implementation of the individual functions or an empirical function is determined via support values such, for example, as a two-dimensional spline function that ascribes a change vector to every element of the matrix is determined.

The process described below details the correction of the error type shown in FIG. 2H. The fan-out effect is primarily a machine-, process- and material-related geometric error. It is caused by the moisture absorption of the paper and the concomitant expansion of the paper. This error cannot be eliminated by simple geometric operators such as displacement, scaling or rotation, because the geometric error is expressed in a trapezoidal distortion of the printed image. The effect can be measured by determining the variation in the width of the subject in the printing direction in consecutive color separations. For the matrix manipulation device 4, this means that a matrix enlargement or compression that varies in width must be implemented. This is performed such that the size of the matrix remains unchanged. In other words, the geometric manipulation is defined such that elements located outside of the matrix are cut off, while elements inside the matrix that remain unoccupied after the transformation are filled with a background color.

Figure 4A:
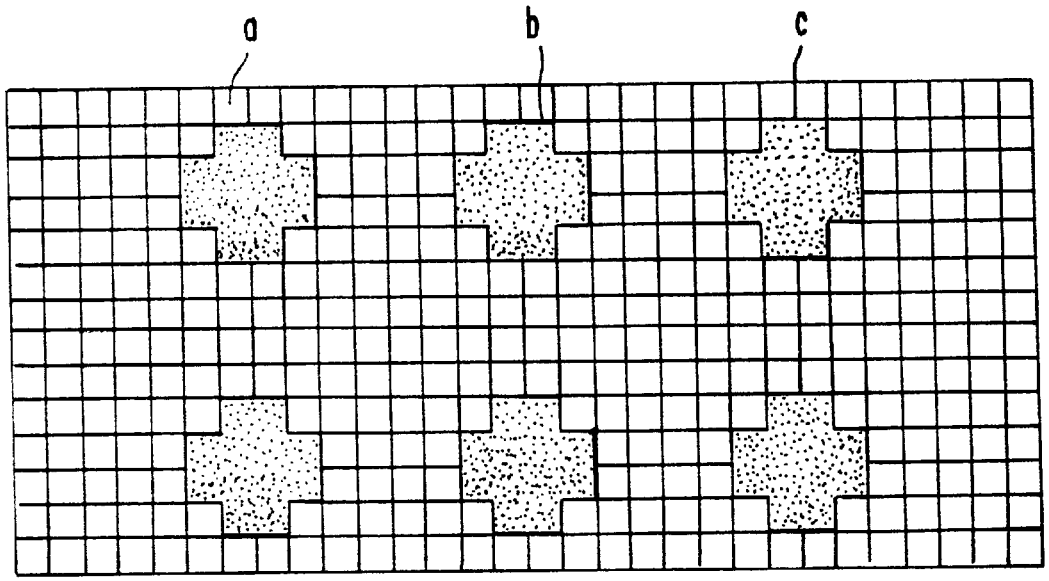
FIGS. 4a and 4b show an application example of a corrected image.
Figure 4B:
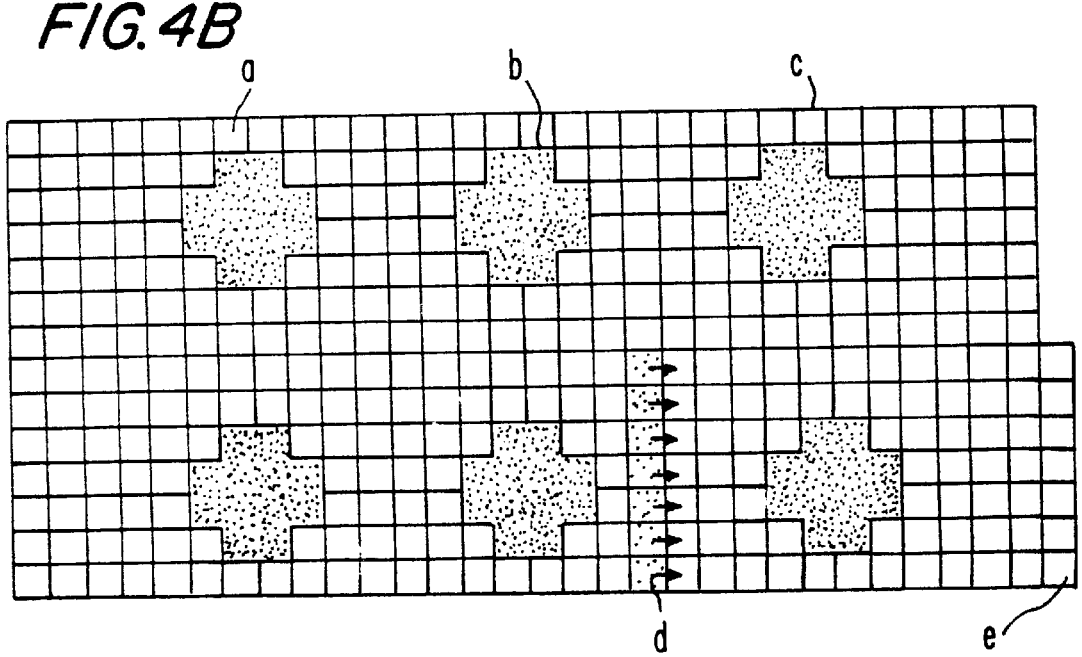

FIGS. 4a and 4b show a detail from a total matrix, in which image elements are inserted. In FIG. 4a, an uncorrected matrix is shown. In this Figure, (a) is a pixel of the total matrix (c), which consists of n×m pixels (a). Further, (b) represents a grid point used for the transfer of image information to a printing stock.

In FIG. 4b, an excerpt from a corrected matrix is shown, where (d) represents the inserted pixels and (e) represents the pixels of the total matrix that are dropped due to the insertion.

Figure 5A:
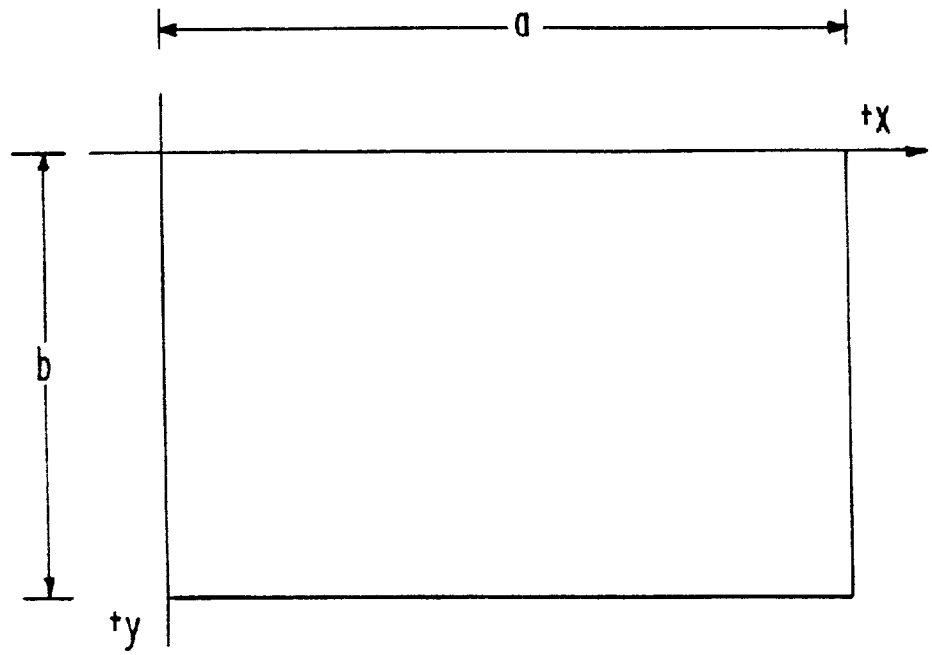
FIGS. 5a and 5b show another application example of a corrected image.
Figure 5B:
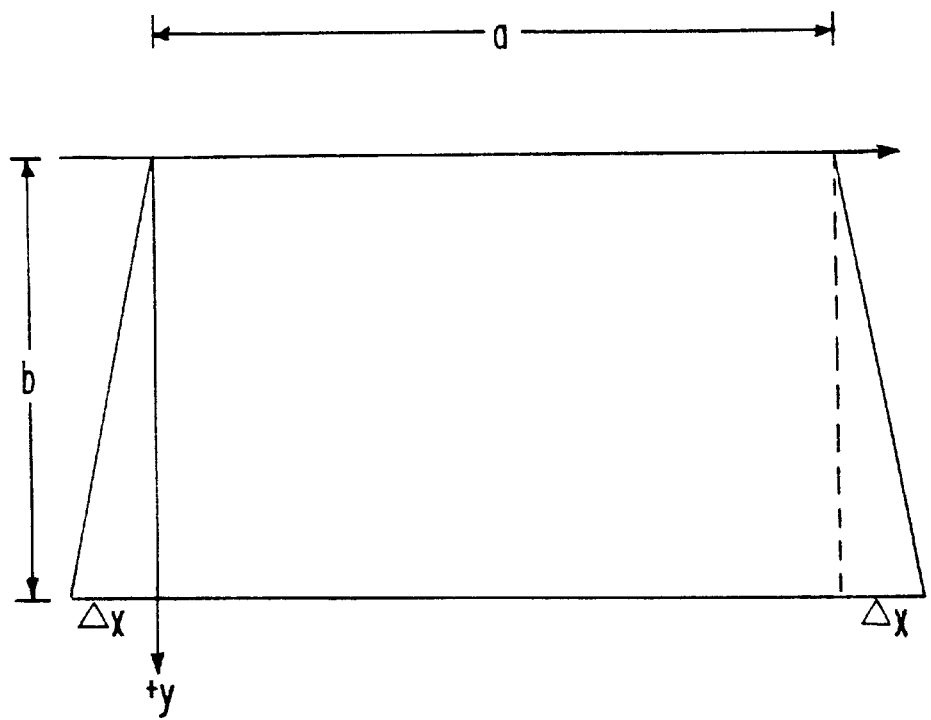

FIGS. 5a and 5b show, in greater detail, a trapezoidal change in a binary information matrix. The information matrix has the size a×b. Because of geometric changes undergone by the printing stock in the printing machine, the individual matrices of the color separations must be changed by a certain Δx for each color separation to achieve optimal print quality in the printed result. In the described trapezoidal geometric change, the change function $f$ is thereby described as follows:

$$f(x, y) = \begin{bmatrix} \Delta x(x, y) \\ \Delta Y(x, y) \end{bmatrix} \quad \begin{matrix} \Delta x = \left[X - \dfrac{b}{2}\right] \cdot y \cdot K \\ \Delta y = 0 \end{matrix}$$

In this case, k is a factor of a linear change in the y-direction. At a maximum paper expansion of 4% at the sheet end, k=0.04/a. For all elements (x, y), the function Δx (x, y), Δy (x, y) holds. For a binary pixel matrix, the changes are described by the following:

$$v(x,y)=(INT(\Delta x(x,y)), INT(\Delta y(x,y)))$$

Here, the function INT(X) describes the whole-number part of the number x.

In this way, a correction function for each location is defined in the form of a displacement vector for displacement by a whole number of elements, which vector describes the corresponding matrix manipulation.

For a matrix whose elements assume n levels, the following then holds:

$$v(x,y)=(\text{INT}(\Delta x(x,y)),\text{INT}(\Delta y(x,y)))$$

The applicable change vectors or displacement vectors can be described in a general fashion by other functions such, for example, as a two-dimensional spline function with suitably selected support points.

The matrix must be worked through row for row, and elements must be removed, inserted or changed to carry out the desired geometric correction. The information matrix is processed such that the size of the total imaging matrix does not change. For example, if an element is inserted into a row, an element is also removed at the beginning or end of the row. To determine the value in the case of an insertion, local filters are used. This means that the insertion value is determined as a function of its neighborhood.

In the simplest case, the element to the left of the inserted element is observed, and this value is copied into the new element. The associated filter then looks as follows:

$$W_{m,n}=W_{m,n-1}$$

Here, $W_{n,m}$ is the value of the element of row m and column n.

The notation used below is known from image processing and describes a convolution or folding of the matrix with the filter matrix. The following filtering is identical to the aforementioned operation:

$$\begin{bmatrix} 0 & 0 & 0 \\ 1 & 0 & 0 \\ 0 & 0 & 0 \end{bmatrix}_{i,j}$$

A filter that better takes the environment into consideration is, for example:

$$\left[\text{ROUND}\left[\frac{1}{8} \cdot \begin{bmatrix} 1 & 1 & 1 \\ 1 & 0 & 1 \\ 1 & 1 & 1 \end{bmatrix}\right]\right]_{i,j}$$

Here, ROUND(x) rounds to the next whole number. Other, more complex filters take into account an environment larger than the immediate neighborhood.

A further refinement is represented by the introduction of a random component that varies the location of the insertion from row to row, so that the changes on the matrix are not visually discernible. This may be done, for example, by introducing a random component in the following random function:

$$\Delta F_{Rand} = \begin{array}{l} \Delta x + \text{Random}(1) - 0.5 \\ \Delta y + \text{Random}(1) - 0.5 \end{array}$$

Here, random(1) describes a random number between 0 and 1. In the same way, the inserted value may be subjected to a random component, which is applied in conjunction with one of the determinations of value already described.

A further embodiment links information on the subject such, for example, as the imposition scheme, to the locations of the displacement. This means that a local change in the information matrix occurs such that elements are inserted only at very particular points. These particular points are preferably information-free points, so that the image impression does not change. These information-free locations are, for example, the regions between the pages of a multi-paged imposition scheme. The information at the changeable locations may be provided by paths superimposed on the image matrix, these paths characterizing regions that must be treated coherently. The link to the change function is then established in such a way that these regions are treated like a rigid element block and transformed as a whole. The change is determined, for example, by the change vector at the center point of the path.

The aforementioned process may also be applied analogously to non-binary matrices. In this case, the displacement vectors are determined as above. Of course, the changes in value are not binary. In the simplest case, the aforementioned algorithms are changed only in that not only 0 or 1, but any possible value, is a permissible result. For example, for an insertion and a value range of the elements 0 to 63, the filter is as follows:

$$\left[\text{ROUND}\left[\frac{63}{8} \cdot \begin{bmatrix} 1 & 1 & 1 \\ 1 & 0 & 1 \\ 1 & 1 & 1 \end{bmatrix}\right]\right]_{i,j}$$

However, non-binary matrices may also be displaced by less than one element. In the simplest case, the resulting matrix is then obtained from an interpolation operation. The simplest rule for this case is that the displacement vectors process non-whole number values in such a way that a linear interpolation takes place for each new value of a matrix element. The interpolation results from the fact that, in general, the associated locations of the elements after the transformation are not whole numbers: $(i,j) \rightarrow (x,y)=(i+\Delta x, j+\Delta y)$. Here, i and j are the whole number parts of the particular coordinates, while $\Delta x$ and $\Delta y$ are the non-whole number parts. $((i-\Delta x), (j-\Delta y))$ thereby describes the element $(i,j)'$ of the matrix M' that, after the transformation, has obtained the associated location $((i-\Delta x), (j-\Delta y))$. To again obtain a regular matrix, the elements are calculated as follows: A regular matrix is interpolated from the irregular matrix M' in the above sense in that linear interpolation is carried out from the four points $((i+\Delta x), (j+\Delta y))$, $((i+\Delta x)-1, (j+\Delta y))$, $((i+\Delta x), (j+\Delta y)-1)$, $((i+\Delta x)-1, (j+\Delta y)-1)$ the new whole number point $(i,j)$. The value of an element $(i,j)$ of the interpolated matrix is then as follows:

$$W_{i,j}=\text{ROUND}(W_{(i+\Delta x), (j+\Delta y)}(1-\Delta x)(1-\Delta y)+W_{(i+\Delta x)-1, (j+\Delta y)}\Delta x(1-\Delta y)+W_{(i+\Delta x), (j+\Delta y)-1}(1-\Delta x)\Delta y+W_{(i+\Delta x)-1, (j+\Delta y)-1}\Delta x\Delta y)$$

It can be concluded from this that an insertion can be less than one element wide. A minimum insertion is then the element dimension divided by the number of levels. In this manner, the insertion may effect the tone value locally to a minimum extent.

The invention is not limited by the embodiments described above which are presented as examples only but can be modified in various ways within the scope of protection defined by the appended patent claims.

We claim:

1. A process for correcting geometric errors in the transfer of information to a printing stock, comprising the steps of:
   creating at least one device-dependent matrix using a device-independent description of the information to be printed;
   supplying the at least one device-dependent matrix to a matrix manipulation device;
   transforming said at least one device-dependent matrix to at least one transformed matrix such that a size of said at least one transformed matrix is the same as a size of the at least one device-dependent matrix by subjecting the elements of the at least one device-dependent matrix to a correction transformation using a correction function depending on previously generated parameter values, wherein the parameter values are generated using measurement technology and the correction function comprises one of inserting, removing, shifting, and changing an individual element of the at least one device-dependent matrix; and supplying the at least one transformed matrix to at least one digital imaging unit.

2. The process of claim 1, wherein said step of transforming further comprises using at least one change function comprising change vectors that are described via two-dimensional spline functions.

3. The process of claim 1, wherein said step of transforming is performed in response to an image content of said at least one device-dependent matrix.

4. The process of claim 1, wherein said step of transforming comprises changing a tone value of an individual element of the at least one matrix.

5. The process of claim 2, wherein said step of using at least one change function comprises using a statistical component that randomizes artifacts, so that a resulting change between said at least one device-dependent matrix and said at least one transformed matrix is visually indiscernible.

6. The process of claim 1, wherein said step of transforming comprises maintaining a size of said at least one device-dependent matrix during said step of transforming and forming one of insertion values and change values using local filtering.

7. The process as in claim 2, wherein said step of using at least one change function comprises maintaining edges of the at least one device-dependent matrix.

8. The process of claim 1, wherein said step of creating at least one device-dependent matrix comprises creating the at least one device-dependent matrix in the form of a bit map.

9. The process of claim 1, wherein said step of creating at least one device-dependent matrix comprises creating at least one device-dependent matrix having elements that assume more than two levels.

10. The process of claim 1, wherein said step of supplying comprises supplying the at least one transformed matrix to at least one digital imaging unit in a printing machine in which printing forms are imaged in the machine.

11. The process of claim 1, wherein said step of transforming comprises effecting a trapezoidal distortion by one of successive insertion and removal of more additional elements per matrix row.

12. The process of claim 11, wherein said step of effecting a trapezoidal distortion comprises determining a number of elements n for the one of successive insertion and removal in each row, dividing each row of said at least one device-dependent matrix into n areas, and one of inserting and removing an element from each said n areas in each row.

13. The process of claim 12, wherein said step of one of inserting and removing an element in successive rows is effected in one of an indented and offset fashion.

14. The process of claim 1, wherein said step of creating at least one device-dependent matrix comprises storing in said device-dependent matrix additional information on the image content.

15. The process of claim 14, wherein said step of transforming comprises one of insertion and removal of elements, said step of storing comprises storing imposition information, and the one of insertion and removal occurs in image-free zones based on said image content.

16. The process claim 1, further comprising the step of storing the parameter values determined by measurement technology in a data base for specific printing configurations.

* * * * *